Dec. 29, 1964   D. J. GREENING ETAL   3,163,812
MOTOR SPEED AND ACCELERATION CONTROL SYSTEMS
Filed April 6, 1959
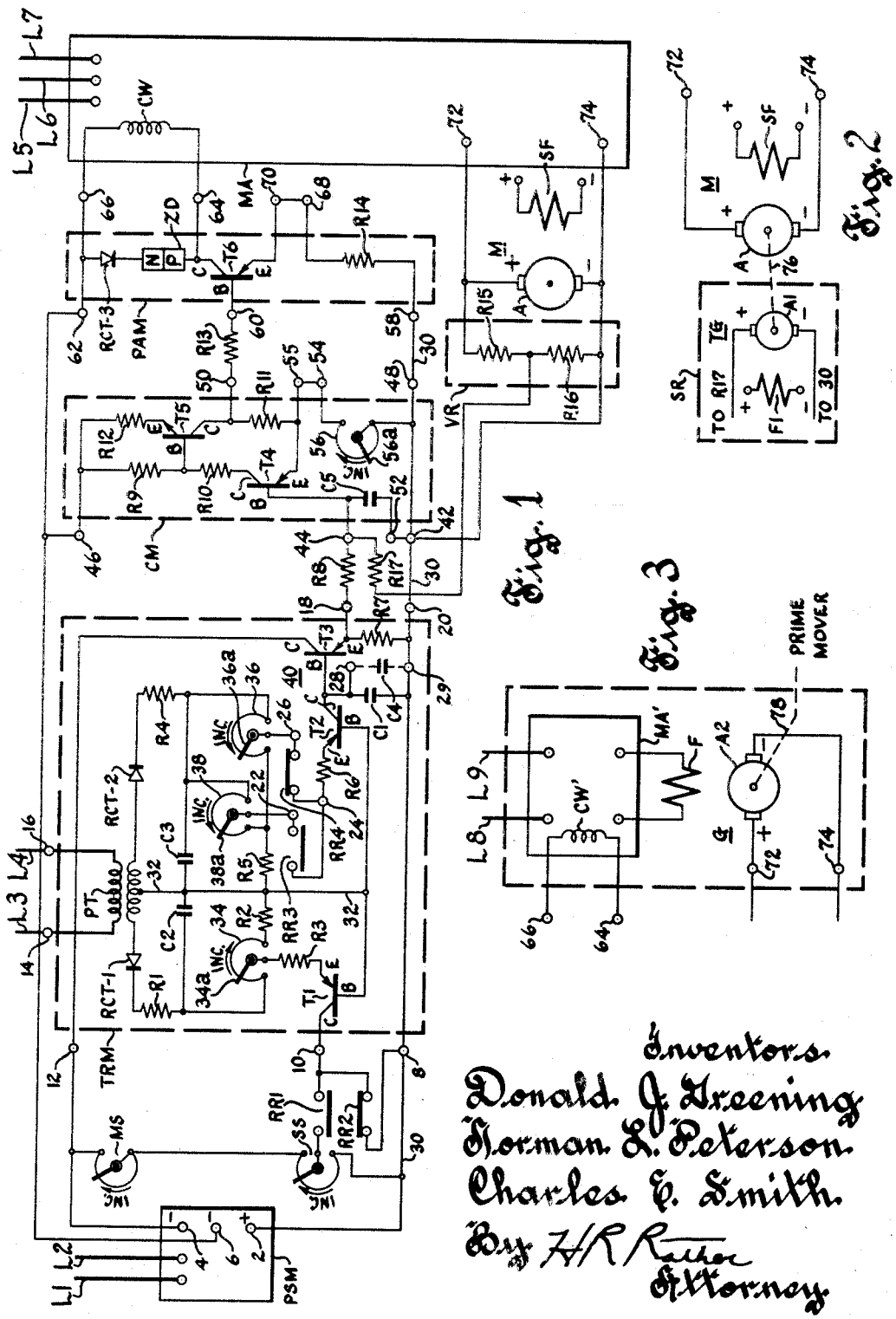
Inventors
Donald J. Greening
Norman L. Peterson
Charles E. Smith
By H R Rether
Attorney

United States Patent Office 3,163,812
Patented Dec. 29, 1964

3,163,812
MOTOR SPEED AND ACCELERATION
CONTROL SYSTEMS
Donald J. Greening, Thiensville, Norman L. Peterson, Wauwatosa, and Charles E. Smith, Milwaukee, Wis., assignors to Cutler-Hammer, Inc., Milwaukee, Wis., a corporation of Delaware
Filed Apr. 6, 1959, Ser. No. 804,300
7 Claims. (Cl. 318—331)

This invention relates to motor control systems and more particularly to adjustable voltage systems for direct current motors.

While not limited thereto, the invention is especially applicable to direct current motor control with time limit acceleration and deceleration and for automatic regulation of the voltage or speed of the motor.

A general object of the invention is to provide a motor control system of the modular type.

A more specific object of the invention is to provide a plurality of component circuits or modules, each having input and output terminals and being readily connectable to one another and to external elements to afford a motor control system.

Another specific object of the invention is to provide component circuits or modules of the semi-conductor controlled type each adapted to be embedded in plastic material and having external terminals for connection in a motor control system.

Another object of the invention is to provide an improved motor control system employing semi-conductor devices.

A further object of the invention is to provide an improved adjustable voltage motor control system of the semi-conductor controlled type having time limit acceleration and deceleration and automatic regulation of the voltage or speed of the motor.

Other objects and advantages of the invention will hereinafter appear.

While the apparatus hereinafter described is effectively adapted to fulfill the objects stated, it is to be understood that we do not intend to confine our invenion to the particular preferred embodiments of motor control systems disclosed, inasmuch as they are susceptible of various modifications without departing from the scope of the appended claims.

The invention will now be described in detail with reference to the accompanying drawings, wherein:

FIGURE 1 diagrammatically depicts a motor control system constructed in accordance with the invention;

FIG. 2 is a fragmentary diagram of a speed regulator circuit which may be substituted in place of the voltage regulator circuit in the lower right hand portion of FIG. 1 to modify the latter; and FIG. 3 shows another modification of FIG. 1 which may be substituted for the magnetic amplifier in the right-hand portion of FIG. 1 to afford an adjustable voltage generator for motor control.

Referring to FIG. 1, there is shown a modular control system for a motor M having an armature A and a shunt field winding SF. Field winding SF may be supplied from a suitable constant direct current source as indicated by the positive and negative symbols. Armature A is supplied with adjustable direct current voltage from a magnetic amplifier MA as hereinafter described to control the speed of the motor.

The control system for magnetic amplifier MA comprises a power supply module PSM, a timed reference module TRM, a comparator module CM, a power amplifier module PAM and a voltage regulator circuit VR. Power supply module PSM is connected through power supply lines L1 and L2 to a single-phase alternating current power supply source and is provided with a positive output terminal 2 and a pair of negative output terminals 4 and 6 for supplying two predetermined different values of direct current output. Power supply module PSM is of a well-known rectifier bridge type and the details thereof have not been shown to avoid complicating the drawings. The rectified output from terminals 2 and 4 is preferably regulated and the rectified output from terminals 2 and 6 may be unregulated.

Timed reference module TRM is provided with external input terminals 8, 10, 12, 14 and 16, external output terminals 18 and 20, external terminals 22, 24 and 26 for connecting the timed reference circuit to interlocking contacts RR3 and RR4 and external terminals 28 and 29 whereby capacitance may optionally be added to the storage circuit to increase the timing range of the system as hereinafter described. A speed setter potentiometer SS and a maximum speed rheostat MS are connected in series across terminals 2 and 4, the movable arm of rheostat MS being connected to the junction thereof with potentiometer SS. Direct current terminals 2 and 4 are also connected to input terminals 8 and 12, respectively, of timed reference module TRM. The movable arm of potentiometer SS is connected through normally open contacts RR1 of an interlocking run relay to input terminal 10 of timed reference module TRM and terminal 8 is connected to terminal 10 through normally closed contacts RR2 of the aforementioned relay. Input terminals 14 and 16 are connected through power supply lines L3 and L4 to a single phase alternating current power supply source.

Timed reference circuit TRM consists primarily of a pair of semi-conductor devices such as transistors of the P-N-P conductivity type or the like arranged in reverse order in serial relation with an energy storage device. To this end, there is provided a transistor T1 and a transistor T2 each having an emitter electrode E, a base electrode B and a collector electrode C. Input terminal 10 is connected to collector electrode C of transistor T1 and input terminal 8 is connected through common conductor 30 and capacitor C1 to collector electrode C of transistor T2. Base electrodes B of transistors T1 and T2 are connected directly to one another.

Control current for transistors T1 and T2 is obtained through a transformer PT having its primary winding connected to terminals 14 and 16 and therethrough and through lines L3 and L4 to the power supply source. The secondary winding of transformer PT is provided with a center tap which is connected through a conductor 32 to the junction of base electrodes B. The left-hand end of the secondary winding is connected through a half-wave rectifier RCT–1, a resistor R1, an acceleration timing potentiometer 34 and a resistor R2 to conductor 32, the junction of resistor R1 and potentiometer 34 being connected through a filter capacitor C2 to conductor 32, to filter the rectified control current. Movable arm 34a of potentiometer 34 is connected through a resistor R3 to emitter electrode E of transistor T1. As a result, movement of arm 34a in the clockwise direction effects decrease in the emitter current in transistor T1 and consequently increases the acceleration time as indicated by the legend adjacent the arrow.

The right-hand end of the secondary winding of transformer PT is similarly connected through a half-wave rectifier RCT–2, a resistor R4, a stopping timing potentiometer 36 and a resistor R5 to conductor 32, the junction of resistor R4 and potentiometer 36 being connected through a filter capacitor C3 to conductor 32 to filter the rectified control current. Movable arm 36a of potentiometer 36 is connected through external terminal 26, normally closed contacts RR4, external terminal 24 and a resistor R6 to emitter E of transistor T2. As a result, movement of arm 36a in the counterclockwise direction effects decrease in the emitter current of transistor T2 and consequently increases the stopping time as indicated by the legend adjacent the arrow.

A deceleration timing potentiometer 38 is connected across potentiometer 36 and movable arm 38a thereof is connected through external terminal 22, normally open contacts RR3, external terminal 24 and the aforementioned resistor R6 to emitter E of transistor T2. Movement of arm 38a in the counterclockwise direction effects decrease in the emitter current of transistor T2 and consequently increases the deceleration time as indicated by the legend adjacent the arrow. External terminals 28 and 29 are provided so that an additional capacitor C4 shown in dotted lines may optionally be connected in parallel with capacitor C1 if it is desired to increase the timing range of the circuit.

The output voltage appearing across capacitor C1 (and capacitor C4 if used) is preferably applied through an amplifier 40 of one or more stages as desired to a comparator circuit CM. Amplifier 40 is provided with a semiconductor device such as transistor T3 of the P-N-P conductivity type or the like having an emitter electrode E, a base electrode B and a collector electrode C. The junction of capacitor C1 and collector electrode C of transistor T2 is connected directly to base electrode B of transistor T3. The other, positive side of capacitor C1 is connected through a resistor R7 to emitter electrode E of transistor T3 and collector electrode C of the latter is connected through terminal 12 to negative terminal 4 of power supply circuit PSM. The output signal from timed reference circuit TRM is obtained from output terminal 20 connected to common positive conductor 30 and output terminal 18 at the junction of resistor R7 and emitter electrode E of transistor T3.

Comparator module CM is provided with external input terminals 42, 44 and 46, external output terminals 48 and 50 and external terminals 52, 54 and 55 for reasons hereinafter described. Output terminal 18 of timed reference circuit TRM is connected through a resistor R8 to input terminal 44 and common conductor 30 directly connects output terminal 20 to input terminal 42. Input terminal 46 of the comparator circuit is connected to negative terminal 6 of power supply module PSM.

Comparator module CM is provided with a semi-conductor device such as a transistor T4 of the P-N-P conducting type having an emitter electrode E, a base electrode B and a collector electrode C. Input terminal 44 is connected directly to base electrode B. Input terminal 42 is connected through common conductor 30 and a gain adjusting rheostat 56 to emitter electrode E. A filter capacitor C5 is connected between base electrode B and common conductor 30. Terminal 52 is provided between capacitor C5 and terminal 42 to afford disconnection of capacitor C5 by removing the jumper between terminals 42 and 52. Alternatively, additional filter capacitance may be added by connecting a capacitor of desired value in parallel with capacitor C5 between terminals 44 and 52. Input terminal 46 is connected through resistors R9 and R10 to collector electrode C of transistor T4.

Comparator module CM is provided with a second semi-conductor device such as a transistor T5 of the opposite or N-P-N conductivity type having an emitter electrode E, a base electrode B and a collector electrode C. The junction of resistors R9 and R10 is connected directly to base electrode B. The junction of emitter electrode E of transistor T4 and rheostat 56 is connected through a resistor R11 to collector electrode C of transistor T5 and emitter electrode E of the latter is connected through a resistor R12 to input terminal 46. The output from comparator circuit CM is obtained from common conductor 30 at output terminal 48 and output terminal 50 at the junction of resistor R11 and collector electrode C of transistor T5. External terminals 54 and 55 which are connected in series between rheostat 56 and the junction of emitter electrode E of transistor T4 and resistor R11 are provided to afford adjustment of the gain and stability of the comparator circuit. Thus, comparator gain may be decreased and stability increased by disconnecting the jumper between terminals 54 and 55 and adding the desired value of resistance between these terminals. Also, comparator gain may be increased and stability decreased by turning movable arm 56a of gain adjusting rheostat 56 in the clockwise direction as indicated by the arrow.

Power amplifier module PAM is provided with external input terminals 58, 60 and 62, external output terminals 64 and 66 and external terminals 68 and 70 for reasons hereinafter described. Output terminal 48 of comparator circuit CM is connected through common conductor 30 directly to input terminal 58. Output terminal 50 of comparator circuit CM is connected through a resistor R13 to input terminal 60 and input terminal 62 is directly supplied from negative direct current output terminal 6 of power supply module PSM.

Power amplifier module PAM is provided with a semiconductor device such as transistor T6 of the P-N-P conductivity type or the like having an emitter electrode E, a base electrode B and a collector C. Input terminal 60 is connected directly to base electrode B, input terminal 58 is connected through a resistor R14 and serially jumpered terminals 68 and 70 to emitter electrode E and collector electrode C is connected directly to output terminal 64. Input terminal 62 is connected to output terminal 66. A semi-conductor device such as a Zener diode ZD of the P-N conductivity type or the like and a blocking, protective half-wave rectifier RCT-3 are connected in series across output terminals 64 and 66. The output from power amplifier module PAM is obtained across output terminals 64 and 66 and applied across control winding CW of magnetic amplifier MA. External terminals 68 and 70 are provided to afford adjustment of the maximum output current of the power amplifier. To this end, the jumper between terminals 68 and 70 may be disconnected and the desired value of resistance connected in place thereof.

Magnetic amplifier MA is of a well-known construction and the details thereof have not been shown to avoid complicating the drawing. Magnetic amplifier MA is preferably supplied from a three-phase alternating current power supply source through power supply lines L5, L6 and L7. The rectified output of magnetic amplifier MA is applied from output terminals 72 and 74 across armature A of motor M. A voltage regulator VR having serially-connected voltage divider resistors R15 and R16 is connected across armature A. The junction of resistor R16 and the negative side of armature A is connected directly to common conductor 30 at input terminal 42 and the junction of resistors R15 and R16 is connected through a resistor R17 to input terminal 44 of comparator circuit CM.

With these connections, a voltage having a value which is a predetermined function of the armature voltage of motor M is compared in comparator circuit CM with the reference voltage output of timed reference circuit TRM to regulate the armature voltage as hereinafter more fully described.

FIG. 2 shows a speed regulator SR which may be substituted for voltage regulator VR to modify the system of FIG. 1. As shown in FIG. 2, rotary armature A of motor M is connected through a shaft 76 to drive armature A1 of tachometer generator TG. Field winding F1 of tachometer generator TG may be energized from a suitable source of constant direct current as shown by the positive and negative symbols. The positive side of armature A1 is connected to resistor R17 of FIG. 1 and the negative side of armature A1 is connected to common conductor 30 at input terminal 42 of FIG. 1. With these connections, a voltage which is a predetermined function of the speed of motor M is compared with the reference voltage in comparator circuit CM to regulate the speed of motor M as hereinafter more fully described.

FIG. 3 shows an alternative adjustable-voltage motor armature voltage source which may be substituted in place of magnetic amplifier MA to modify the system of FIG. 1. As shown in FIG. 3, a magnetic amplifier MA' of known type is supplied through lines L8 and L9 from a single-phase alternating current power supply source. Magnetic amplifier MA' is provided with a control winding CW' which is energized from output terminals 64 and 66 of power amplifier circuit PAM in FIG. 1. The rectified output of magnetic amplifier MA' is connected across field winding F of a direct current generator G. Armature A2 of generator G is mechanically driven through shaft 78 by a prime mover such as an alternating current motor or the like. Armature A2 of the generator is connected to terminals 72 and 74 and therethrough across armature A of the motor. With these connections, the generator supplies the motor armature voltage and the value thereof may be adjustably controlled by varying the generator field excitation in accordance with the reference voltage.

The operation of the system of FIG. 1 will now be described. Let it be assumed that single-phase alternating current power is connected through lines L1 and L2 to power supply circuit PSM and lines L3 and L4 to timed reference circuit TRM and that three-phase alternating current power is connected to lines L5, L6 and L7 of magnetic amplifier MA. As a result, direct current flows from positive output terminal 2 of power supply circuit PSM through the resistor of speed setter potentiometer SS and the movable arm and upper portion of the resistor of maximum speed rheostat MS to negative terminal 4 of the power supply circuit. The alternating current power connection through lines L3 and L4 to input terminals 14 and 16 of timed reference circuit TRM energizes the primary winding of transformer PT. As a result, half-wave rectified current flows from the left-hand end of the secondary winding of transformer PT through rectifier RCT-1, resistor R1, the resistor of acceleration timing potentiometer 34, resistor R2 and conductor 32 to the center tap of the secondary winding. An adjustable portion of the voltage drop across potentiometer 34 and resistor R2 is applied from movable arm 34a through resistor R3 and conductor 32 across emitter electrode E and base electrode B of transistor T1.

Similarly, half-wave rectified current flows during each alternate half-cycle from the right-hand end of the secondary winding of transformer PT through rectifier RCT-2, resistor R4, the resistor of stopping timing potentiometer 36, resistor R5 and conductor 32 to the center top of the secondary winding. An adjustable portion of the voltage drop across potentiometer 36 and resistor R5 is applied from movable arm 36a through contacts RR4, resistor R6 and conductor 32 across emitter electrode E and base electrode B of transistor T2.

Connection of power to lines L5, L6 and L7 energizes magnetic amplifier MA but no output voltage is obtained from terminals 72 and 74 until control winding CW is energized as hereinafter described.

To initiate operation of the system, run contacts RR1 and RR3 are closed and run contacts RR2 and RR4 are opened. Contacts RR1 connect the negative voltage from the movable arm of potentiometer SS through input terminal 10 to collector electrode C of transistor T1. Contacts RR2 disconnect the collector electrode of transistor T1 from positive terminal 8. Contacts RR4 disconnect movable arm 36a of stopping timing potentiometer 36 from transistor T2 and contacts RR3 connect movable arm 38a of deceleration timing potentiometer 38 through resistor R6 to emitter electrode E of transistor T2. Emitter to base bias voltage having been applied to transistor T1, the latter is rendered operative to pass constant current as determined by the setting of movable arm 34a of potentiometer 34. Thus, constant current flows from input terminal 8 through common conductor 30, storage capacitor C1, transistor T2 in the reverse direction, resistor R2, the right-hand portion of the resistor of potentiometer 34 and arm 34a, resistor R3, emitter and collector electrodes of transistor T1 and contacts RR1 to the movable arm of speed setter potentiometer SS. Capacitor C1 charges in response to the aforementioned constant current flow therethrough and the voltage across the capacitor increases linearly.

Timed reference circuit TRM utilizes two significant transistor characteristics; (1) for normal polarity connections, the collector current is a function of the emitter current and is essentially independent of collector voltage, and (2) the transistor functions substantially as a short circuit to currents opposite to the normal polarity connections. Therefore, when the input voltage is higher than the output voltage, a current will flow from the input source to charge capacitor C1. This current will flow through transistor T2 as if it were a short circuit and will charge capacitor C1 until the output voltage equals the input voltage. Since the magnitude of this current is essentially solely a function of the emitter current of transistor T1 and the latter current is constant for any given setting of potentiometer 34, the voltage across capacitor C1 will increase as a linear function of time.

If the input voltage is decreased by resetting speed setter potentiometer SS so that the output voltage has a higher value than the input voltage, the output voltage will decrease as a linear function of time until the output voltage equals the input voltage. Thus, capaictor C1 discharges through transistor T1 as if it were a short circuit. The magnitude of this current is essentially solely a function of the emitter current of transistor T2 and since the latter current is constant for any given setting of potentiometer 38, the voltage across capacitor C1 will decrease as a linear function of time.

Terminal 28 is provided so that the timing range of timed reference circuit TRM may be increased as desired by connection of an additional capacitor C4 in parallel with capacitor C1. The output voltage appearing across capacitor C1 (and capacitor C4 if used) is applied through an amplifier 40 of one or more stages as desired to the input terminals of comparator module CM. Thus, the voltage across capacitor C1 is applied across the emitter and base electrodes of amplifier transistor T3. This effects flow of current from conductor 30 through resistor R7, emitter E and collector C of transistor T3 to negative terminal 4 of power supply circuit PSM. The voltage drop across resistor R7 is applied to output terminals 18 and 20 of the timed reference circuit and therethrough and through resistor R8 to input terminals 42 and 44 of comparator circuit CM. The value of resistor R7 is selected so that the voltage at output terminal 18 may be varied linearly from its maximum negative value all the way to the value of voltage at output terminal 20. The input voltage to comparator circuit CM is filtered by capacitor C5 and applied across the emitter and base electrodes of transistor T4 to render the latter conducting. As a result, current flows from input terminal 42 through arm 56a and the upper portion of the resistor of rheostat 56, emitter electrode E and collector electrode C of transistor T4, resistors R10 and R9 and input terminal 46 to negative terminal 6 of power supply circuit PSM. The voltage drop across resistor R9 is applied across the emitter and base electrodes of transistor T5 to afford negative bias voltage to render the latter conducting. As a result, current also flows from input terminal 42 through arm 56a and the upper portion of the resistor of rheostat 56, resistor R11, collector C and emitter E of transistor T5, resistor R12 and input terminal 46 to negative terminal 6 of power supply circuit PSM.

Transistors T4 and T5 are of opposite conductivty types to afford connection thereof in the circuit shown thereby to permit use of a common conductor 30 extending through the control system and to afford temperature compensation. In the event the current through transistor T5 increases, for example, due to ambient temperature changes, the voltage drop across rheostat 56 correspondingly increases. This causes the positive bias voltage at emitter electrode E of transistor T4 to become less positive. This decreases the conduction through transistor T4 and the voltage drop across resistor R9. The resultant decrease in the negative bias voltage at emitter E of transistor T5 readjusts the output voltage of the comparator circuit. If the current through transistor T4 increases due to ambient temperature changes, the negative emitter bias voltage of transistor T5 is increased. The voltage drop across rheostat 56 correspondingly increases and the emitter of transistor T4 becomes less positive to effect compensation. As a result, the output of comparator circuit CM is automatically stabilized to a value determined by the reference voltage and the setting of movable arm 56a of rheostat 56 and is regulated by feedback so that it will not vary in response to temperature changes. The output of the comparator circuit corresponding to the voltage drop across rheostat 56 and resistor R11 is applied to output terminals 48 and 50 and therethrough and through resistor R13 to input terminals 58 and 60 of power amplifier circuit PAM. This output of comparator circuit CM is applied from input terminals 58 and 60 across the emitter and base electrodes of transistor T6 to render the latter conducting. This effects flow of current from input terminal 58 through resistor R14, emitter E and collector C of transistor T6, output terminal 64, control winding CW of magnetic amplifier MA, output terminal 66 and input terminal 62 to negative terminal 6 of power supply PSM. Rectifier RCT–3 blocks current flow in shunt of winding CW.

As a result of energization of control winding CW, magnetic amplifier MA is biased to its "on" condition and supplies output voltage from terminals 72 and 74 thereof to armature A of motor M. Shunt field winding SF having been energized as hereinbefore described, the output of magnetic amplifier MA causes operation of the motor.

A predetermined portion of the armature voltage is applied from the junction of resistors R15 and R16 through a resistor R17 to input terminal 44 of comparator circuit CM. It will be apparent from the polarity of the armature voltage that this voltage regulator feedback voltage has a positive value. It will be apparent that the output voltage applied from terminal 18 of the timed reference circuit TRM through resistor R8 to input terminal 44 has a negative value. These voltages are added algebraically or, in other words, the voltage regulating feedback derived from voltage divider VR is subtracted from the reference voltage output of the timed reference circuit and the resultant voltage is applied through comparator circuit CM and power amplifier circuit PAM to control magnetic amplifier MA. This effects regulation of the armature voltage of motor M to a predetermined value.

In view of the constant current characteristics of transistor T1 whereby capacitor C1 is charged linearly, the amplified voltage applied to control winding CW of magnetic amplifier MA and consequently the armature voltage of motor M increases linearly as a function of time. As a result, the motor accelerates. The acceleration time may be increased by turning movable arm 34a of acceleration timing potentiometer 34 clockwise in the direction of the arrow. This effects decrease in the emitter to base current of transistor T1 and consequently controls the latter to decrease the value of the charging current applied to capacitor C1. Conversely, the acceleration time may be decreased by turning potentiometer 34 in the other direction to increase the emitter to base current of transistor T1. Transistor T2 has essentially no effect on the charging current because this current flows therethrough in the reverse direction whereby transistor T2 exhibits very low, negligible impedance.

The magnitude of the output voltage applied to armature A of motor M may be increased by turning speed setter potentiometer SS clockwise in the direction of the arrow and decreased in turning the same in the opposite direction. This causes corresponding increase or decrease in the motor speed. The maximum voltage obtainable by adjustment of speed setter potentiometer SS is determined and adjusted by setting the movable arm of maximum speed rheostat MS. Turning the movable arm of the latter all the way clockwise in the direction of the arrow shunts the resistance of rheostat MS effectively out of circuit so that the maximum voltage applicable to the timed reference circuit is substantially equal to the voltage derived from output terminals 2 and 4 of power supply circuit PSM.

When the movable arm of potentiometer SS is turned in the counterclockwise direction to decrease the motor speed, transistor T1 acts as a short circuit to current flowing in the reverse direction therethrough and transistor T2 passes a current of constant value to discharge capacitor C1. The value of the discharge current is determined by the setting of deceleration timing potentiometer 38. Turning arm 38a of potentiometer 38 counterclockwise in the direction of the arrow effects decrease in the emitter current of transistor T2 and consequently controls the latter to decrease the discharge current thereby to increase the motor deceleration time. Conversely, the deceleration time may be decreased by turning arm 38a in the opposite direction to increase the emitter current of transistor T2 to effect quicker discharge of capacitor C1.

The stopping time of the motor may be controlled from potentiometer 36 in substantially the same manner hereinbefore described in connection with potentiometer 38 for controlling the deceleration time of the motor, these potentiometers being alternatively connectable to control transistor T2.

To stop the motor, contacts RR1 and RR3 are opened and contacts RR2 and RR4 are closed. Opening of contacts RR1 disconnects the movable arm of potentiometer SS and thus the adjustable input voltage from input terminal 10 of the timed reference circuit and contacts RR3 disconnect deceleration timing potentiometer 38 from the emitter electrode of transistor T2. Contacts RR2 complete a discharge circuit for capacitor C1 and contacts RR4 connect arm 36a of stopping timing potentiometer 36 to the emitter electrode of transistor T2. As a result, capacitor C1 discharges in a circuit extending through common conductor 30, terminal 8, contacts RR2, terminal 10, transistor T1 in the reverse direction, resistor R5, the left-hand portion of the resistor of potentiometer 36 and arm 36a, contacts RR4, resistor R6 and the emitter and collector electrodes of transistor T2 to capacitor C1. The value of the discharge current is constant for any given setting of potentiometer 36. The stopping time may be increased by turning arm 36a counterclockwise in the direction of the arrow to decrease the value of discharge current. Conversely, the stopping time may be decreased by turning arm 36a in the clockwise direction to increase the value of discharge current.

Transistor T6 of power amplifier circuit PAM is protected from the inductive effect of control winding CW. It will be apparent that when the motor is accelerated, the output current of the power amplifier flows through control winding CW and rectifier RCT–3 blocks current flow through the shunt circuit. However, when the motor is decelerated or stopped, the shunt circuit prevents current flow of large magnitude through transistor T6 which might damage or destroy the latter. Thus, current caused to flow by the inductive countervoltage of winding CW in response to collapse of its magnetic field flows through terminal 66, rectifier RCT–3, diode ZD and terminal 64. Diode ZD is of the Zener type and responds to a voltage of predetermined value to effect an avalanche of current flow therethrough to protect transistor T6.

Referring to FIG. 2, it will be apparent that when speed regulator SR shown within the broken lines is substituted for voltage regulator VR shown within the broken lines in FIG. 1 and the motor armature is connected by shaft 76 to drive tachometer generator TG, the system is modified to afford automatic regulation of the motor speed. With these connections, tachometer generator TG provides an output voltage which is proportional to motor speed. This voltage is fed back through resistor R17 to input terminal 44 of comparator circuit CM and compared in the latter with the reference voltage derived from timed reference circuit TRM. The resultant voltage is applied from comparator circuit CM through power amplifier PAM to control winding CW of magnetic amplifier MA which in turn controls the motor armature voltage. Thus, any undesired variation in motor speed is immediately reflected in magnetic amplifier MA and the latter readjusts the voltage applied across armature A to maintain the motor speed constant.

When the apparatus shown in FIG. 3 is substituted for magnetic amplifier MA of FIG. 1, the power amplifier output voltage is applied from output terminals 64 and 66 across control winding CW' of magnetic amplifier MA'. The rectified output from magnetic amplifier MA' is employed to provide adjustable excitation of field winding F of generator G. Armature A2 of generator G is driven by a prime mover and the generator armature output voltage is applied through terminals 72 and 74 across armature A of motor M. This modified system operates substantially as hereinbefore described and the generator output voltage may be adjusted by varying its field excitation. Either voltage regulation as shown in the lower right-hand portion of FIG. 1 or speed regulation as shown in FIG. 2 may be employed with the system when modified in accordance with FIG. 3.

It will be apparent that the systems hereinbefore described are extremely simple in construction and efficient in operation. The system is constructed of modular component circuits with a minimum of external control elements which may readily be connected to the external terminals provided. The novel modular circuits devised are adapted for potting in plastic material because only long lasting elements are employed therein which do not require replacement over long periods of operational use. Only those elements which may be varied in value depending upon the power supplied used are connected externally of the modules in the control system. The timed rate of acceleration and deceleration and stopping of the motor may be individually selected as desired. Since constant currents are employed to charge and discharge capacitor C1 and the value of such current is essentially solely a function of the emitter current of the transistor, the system affords linear control of the motor armature voltage all the way to zero voltage difference between the input voltage at terminal 10 and the voltage across capacitor C1. Also, the comparator circuit has been constructed so that it will automatically compensate for any variation in conduction through the transistors thereof due to temperature changes.

We claim:

1. In an adjustable voltage drive, the combination comprising:
    (a) a direct current motor having a shunt field winding energized from a source of unidirectional electrical power and an armature winding,
    (b) means providing a source of constant but adjustable first voltage,
    (c) means comprising adjustably controllable substantially constant current passing semiconductor means and an energy storage device and being responsive to said first voltage to provide a second voltage which changes in magnitude linearly at a timed rate in response to change in magnitude of said first voltage,
    (d) means controlled by said second voltage for supplying to said armature winding a unidirectional energizing current to cause operation of the motor,
    (e) and means for controlling said semi-conductor means comprising adjustable means effective when adjusted in uniform steps for causing corresponding adjustments in proportion thereto of the magnitude of the current passing through said semi-conductor means whenever the magnitude of said first voltage is changed thereby to cause proportional adjustments in the rate of change of the magnitude of said second voltage,
    (f) and said adjustments in the rate of change of the magnitude of said second voltage modifying the control of said armature supplying means to cause proportional changes in said armature energizing current thereby to afford adjustments in the rate of change of motor speed proportional to said adjustments of said adjustable means.

2. The invention defined in claim 1, wherein said means for controlling said semi-conductor means comprises:
    (a) a source of control voltage,
    (b) a voltage divider connected to said control voltage source and comprising adjustable means for obtaining an adjustable voltage therefrom,
    (c) and means connecting said adjustable means to said semi-conductor means adjustably to control the magnitude of current passing through the latter.

3. The invention defined in claim 1, wherein said means for controlling said semi-conductor means comprises:
    (a) a source of control current,
    (b) a potentiometer comprising a resistor connected to said control current source whereby a voltage is developed across said resistor and a movable tap on said resistor,
    (c) and means connecting said movable tap and one end of said resistor to said semi-conductor means whereby equal adjustments of said tap afford equal changes in motor accelerating armature current in proportion thereto.

4. In an adjustable voltage drive, the combination comprising:
    (a) a direct current motor having a shunt field winding energized from a source of unidirectional electrical power and an armature winding,
    (b) means providing a source of constant but adjustable first unidirectional voltage,
    (c) means comprising adjustably controllable constant current conducting semi-conductor means and an energy storage device and being responsive to said first voltage to provide a second unidirectional voltage which changes in magnitude linearly at a timed rate in response to change in magnitude of said first voltage,
    (d) means comprising electrical power control means controlled by said second voltage for supplying to said armature winding a unidirectional energizing current to effect operation of the motor,
    (e) and means for controlling the current conduction in said semi-conductor means comprising a source of adjustable unidirectional control voltage effective when adjusted in equal increments to cause proportional incremental adjustments of the magnitude of the current conduction therein when the magnitude of said first voltage is changed thereby to cause respectively proportional incremental adjustments in the rate of change of the magnitude of said second voltage,
    (f) and said adjustments in the rate of change of the magnitude of said second voltage causing proportional changes in the magnitude of said armature energizing current thereby to afford incremental adjustments in motor accelerating armature current and consequent incremental adjustments of the rate of change of motor speed.

5. In a system for controlling the speed and for adjusting the rates of change of speed of a direct current motor,
  (a) a direct current motor having a shunt field winding energized from a source of unidirectional electrical power and an armature winding,
  (b) electrical power supply means for supplying adjustable current to the motor armature winding,
  (c) and means for controlling said power supply means comprising:
  (d) a source of input reference voltage,
  (e) a speed setter for deriving a selectively adjustable operating voltage from said reference voltage source,
  (f) a timed reference network responsive to change in magnitude of said operating voltage for providing an output voltage which changes in magnitude linearly at a timed rate comprising:
  (g) first and second controllable semi-conductor devices of the constant current conduction type and an energy storage device,
  (h) means for connecting said semi-conductor devices and said energy storage device to said speed setter whereby said first semi-conductor device controls current flow for storing energy in said energy storage device which current flows reversely through low impedance electrodes of said second semi-conductor device and said second semi-conductor device controls current flow for discharging energy from said energy storage device which current flows reversely through low impedance electrodes of said first semi-conductor device,
  (i) and means for controlling each said semi-conductor device comprising a source of adjustable control voltage effective when adjusted in uniform steps for causing proportional adjustments of the magnitude of current flowing in the respective semi-conductor device when the magnitude of said operating voltage is adjusted thereby to cause proportional adjustments in the rate of change of the magnitude of the output voltage across said energy storage device,
  (j) and means responsive to said adjustments in the rate of change of the magnitude of said output voltage for controlling said power supply means to cause proportional adjustments in the motor decelerating current supplied to said armature winding thereby to afford adjustments in the rate of change of motor speed proportional to said uniform adjustments of said control voltage.

6. The invention defined in claim 5, together with additional means for controlling said second semi-conductor device whereby the latter controls current flow for discharging energy from said energy storage device for stopping the motor,
  (a) and said connecting means comprising switching means for disconnecting said speed setter from said semi-conductor devices and for rendering said additional means effective.

7. The invention defined in claim 6, wherein said additional means comprises:
  (a) a source of control current,
  (b) a potentiometer comprising a resistor connected across said control current source whereby a voltage is developed across said resistor and a movable tap on said resistor,
  (c) and means comprising said switching means for connecting said movable tap and one end of said resistor to said second semi-conductor device whereby equal adjustments of said tap afford equal adjustments in the rate of decrease of motor speed.

References Cited in the file of this patent
UNITED STATES PATENTS

| | | |
|---|---|---|
| 2,546,799 | Thatcher | Mar. 27, 1951 |
| 2,785,368 | Elliot | Mar. 12, 1957 |
| 2,847,632 | Harvey et al. | Aug. 12, 1958 |
| 2,902,634 | Anger | Sept. 1, 1959 |
| 2,929,980 | Anger | Mar. 22, 1960 |
| 3,088,064 | Anger | Apr. 30, 1963 |